United States Patent Office 2,780,256
Patented Feb. 5, 1957

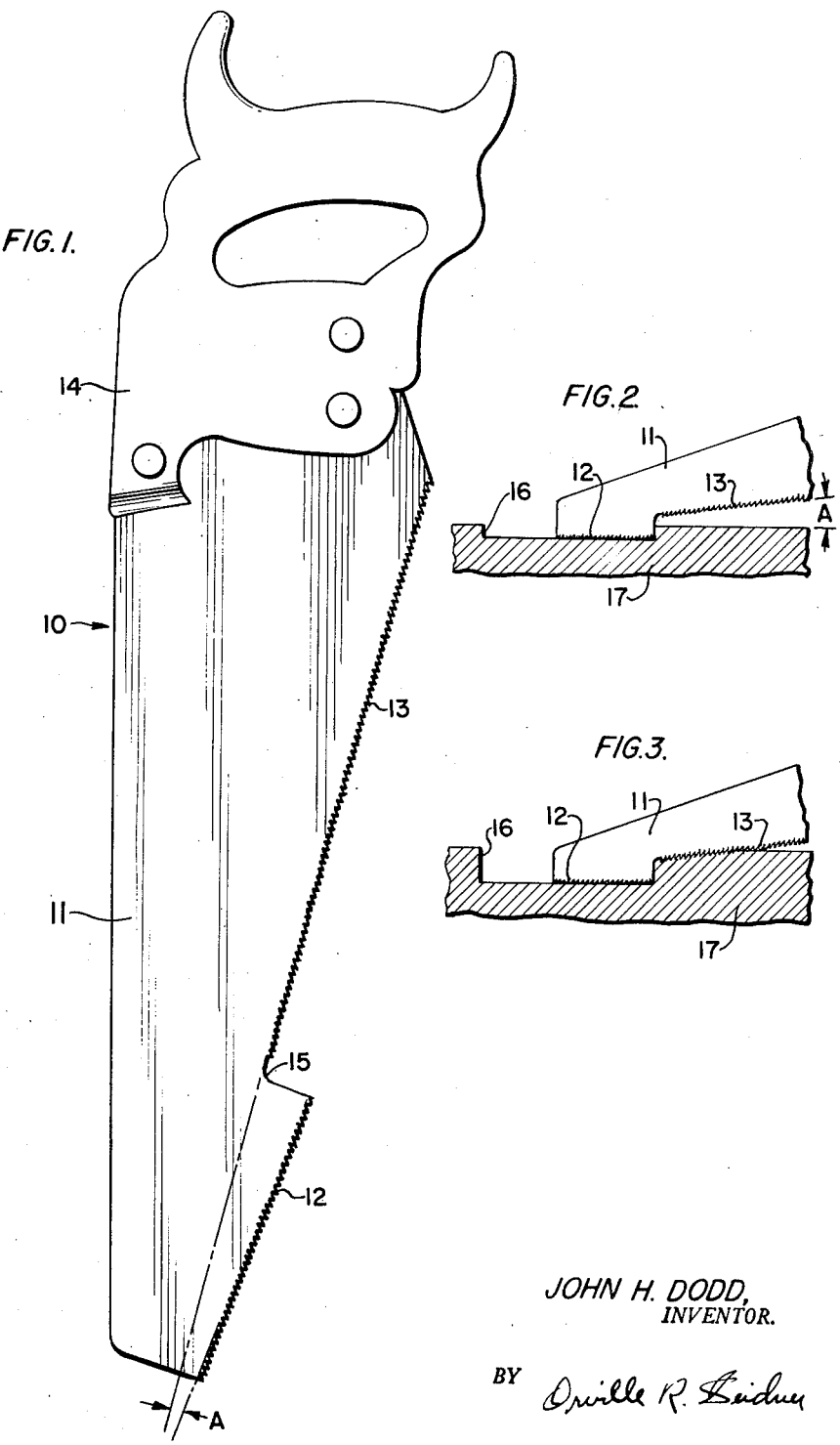

2,780,256

HANDSAW

John H. Dodd, Temple City, Calif.

Application February 19, 1954, Serial No. 411,377

4 Claims. (Cl. 145—31)

This invention relates to a handsaw and more particularly to a handsaw having a plurality of toothed portions arranged in stepped relation to each other.

Conventional handsaws having a single, straight row of saw teeth can only be used to start a cut at the edge of a panel or other structure. Conventional keyhole saws must be utilized in structure wherein a hole is provided in which the saw cut may be started but neither of such saws are capable of starting a cut in the middle of an extensive panel or wall structure without first having a hole provided therein for insertion of the saw blade. Such conventional saws are not capable of making a straight, neat cut in the middle of an extensive panel or wall structure without somewhat mutilating the structure or making an uneven or crooked cut.

According to the present invention a handsaw is provided with a blade having a plurality of toothed portions arranged in stepped relationship to each other whereby one relatively short toothed portion near the end of the saw blade is so offset that the remainder of the saw blade clears the surface of a wall or panel while a cut is being made thereinto by the short toothed portion. The short toothed portion near the end of the blade is of sufficient length to promote accurate straight cutting of an opening into a panel or wall through which the saw blade may be inserted for completion of the desired cut. The stepped structure of the saw blade according to the present invention provides a stop which prevents the saw blade from being completely retracted from the cut being made in a panel or wall, whereby the end of the saw blade is not inadvertently removed from the saw cut and jammed against the structure or work being cut. Thus, the stepped structure of the saw blade provides a means which prevents marring structure adjacent the saw cut during such cutting operations.

The handsaw, according to the present invention, is capable of starting a saw cut in the middle of a panel or wall structure and completing the same in a straight line for a distance within the structure as desired. A particular feature of the stepped tooth portions is that a small included angle is formed by lines projected along the teeth of the portions. There is thus provided a feature whereby when the short toothed portion has sawn to a depth sufficient to bring the second toothed portion into contact with the object being sawed, the second toothed portion engages that object at substantially the angle between the toothed portions.

It is an object of the present invention to provide a handsaw which is particularly useful in cutting structure of extensive walls or panels when it is desired to start the cut at an intermediate location therein.

Another object of the invention is to provide a handsaw which is particularly useful in remodeling houses or building structures wherein it is desired to install windows or doors in existing wall structures.

Another object of the invention is to provide a handsaw of this class which may be used to provide an entrance opening through a wall for further cutting operations of the handsaw, whereby, the same saw may be used for entering the structure and completing the cut therein.

Another object of the invention is to provide a saw blade having a stepped, stop portion which prevents inadvertent withdrawal of the saw blade from a saw cut and consequent marring of surfaces adjacent the cut.

A further object of the invention is to provide a handsaw wherein stepped toothed blade portions are arranged to permit manual stabilization of the saw blade when making a blade entrance cut in an intermediate portion of an extensive panel or wall surface.

Another object of the invention is to provide a handsaw having a blade with stepped toothed blade portions, the said portions being particularly characterized in that line projections along the teeth of each of said portions will form a small included angle.

A still further object of the invention is to provide a special purpose handsaw which is very simple and economical of construction in proportion to its utility and which is very durable and easy to operate.

Additional objects and advantages of the invention will be apparent from the following specification, claims, and drawing forming a part of this application in which:

Fig. 1 of the drawing is a side elevational view of a handsaw constructed in accordance with the present invention;

Fig. 2 is an elevation view of the saw starting a cut in a timber shown in cross section; and Fig. 3 is a view similar to Fig. 2 and showing the saw cut at an advanced stage.

The saw 10, as shown in the drawing, is provided with a blade 11 having toothed saw blade portions 12 and 13 along one edge of the blade, the portions being arranged in offset or stepped relationship to each other. It will be noted that the toothed blade portion 12 is near the extending end of the blade 11 distal of the handle 14, and that the toothed blade portion 12 is substantially shorter than the toothed blade portion 13. Between the toothed portions 12 and 13 is a transition 15 which forms a stop adapted to engage one side of the work piece after the saw blade 11 has been inserted therethrough. The stop 15 may be utilized to prevent complete withdrawal of the blade 11 from the saw cut in which the blade 11 is positioned. It will be seen that the stepped or offset toothed portions 12 and 13 are provided with substantially conventional saw teeth extending in the direction in which the toothed portions 12 and 13 are spaced or offset. Thus, the stepped relation of the toothed blade portions 12 and 13 are provided with pointed teeth which may be conventional crosscut teeth or rip saw teeth if desired. For certain purposes other toothed forms may be used for working various materials to which they may be appropriate.

It will be noted that if lines are projected along the stepped portions 12 and 13 a small included angle A is formed by the lines. For a particular saw which was made up for all-around general carpentry work, it was found that an angle A of about 7 degrees was very satisfactory for the purpose. It will be apparent, of course, that the amount of the angle is not controlling. It is sufficient generally that there be some angle and it may be smaller than the figure given here or possibly might be considerably larger, as will be apparent from the operation described hereinbelow.

The operation of the handsaw, according to the present invention and as shown in the drawing, is substantially as follows:

The toothed portion 12 of the blade 11 is substantially shorter than the toothed portion 13 thereof and since the short toothed portion 12 is at the opposite end of the blade 11 from the handle 14 it is employed for the purpose of making an entrance cut for insertion of the blade 11 in order that the toothed portion 13 may be used to complete a desired cut in a wall or panel. When the toothed portion 12 is employed for entrance into an intermediate portion of an extensive panel or wall structure, the toothed portion 13 clears the surface of the panel or wall structure a distance equal to the offset stepped distance between the toothed portions 12 and 13. If desired, the blade 11 may be grasped adjacent the transition 15 for stabilizing the toothed portion 12 while it is being reciprocated at the surface of a panel or wall for cutting a straight saw cut therein. It will be seen that the length of the toothed portion 12 is sufficient to provide a cut in a panel structure of sufficient length to permit entrance of the blade 11.

After the blade 11 has been inserted in the cut made by the toothed portion 12, a continuing straight cut may be completed by means of the toothed portion 13 which is substantially longer and which provides for greater stroke length permitting rapid sawing through a panel or wall structure. Thus, in Fig. 2 there is depicted the saw 10 in which the toothed portion 12 is being reciprocated within the saw cut 16 in the wood 17. As the cut 16 becomes deeper the toothed portion 13 approaches the wood and ultimately engages it at the angle A as shown in Fig. 3.

It is now apparent why it is preferred that the toothed portions 12 and 13 be not substantially parallel, since the included angle A precludes the whole of the toothed portion 13 from engaging the top surface of the wood 17. Very often it is desirable that only a relatively short saw cut be made through a piece of lumber, timber, or other structure. Obviously if the whole of the toothed portion were to engage, the cut then being made might be longer than that desired. Also the sawing is much more difficult since more teeth are then engaged in making cuts.

Also, it will be understood that a very clean saw cut may be made through a wall for the purpose of providing a window or doorway opening therein. When sawing out such an opening four entrance cuts may be made by the toothed portion 12 and four completing cuts may be followed through by the toothed portion 13 of the blade, whereupon a rectangular section of a wall may be removed and a window or door frame placed therein.

When it is desired to saw a wide panel of plywood or other similar material into two pieces, a saw cut may be started in the middle by means of the toothed blade portion 12 and when an entrance cut is provided the blade 11 may be extended therethrough and the cut may be completed to one edge of the panel by means of the toothed portion 13. In this manner, a panel may be cut from the middle to one edge and then subsequently cut from the middle to the opposite edge, thereby completing a cross cutting operation on a very wide panel.

It will be seen from an inspection of the drawing that the transition 15 between the offset or stepped toothed portions 12 and 13 may provide a stop for the blade 11 when it is reciprocated back and forth in a saw cut, during which time the toothed portion 13 is actively cutting the work. The transition 15 when acting as a stop prevents complete withdrawal of the blade 11 from the saw cut and thereby prevents marring of the work adjacent the saw cut, by the end of the blade. The handle 14 being a substantially conventional saw handle is used in the normal manner and, as hereinbefore described, the handle 14 may be held by one hand of the operator while the blade 11 may be stabilized adjacent the transition 15 for holding the toothed portion 12 in proper precise alignment during the cutting of an entrance opening through a panel or wall structure to accomplish the insertion of the blade 11.

Having thus described the present invention it is desired to emphasize the fact that many modifications may be resorted to in a manner limited only by the just interpretation of the following claims.

I claim:

1. A saw blade adapted to sawing with one edge thereof, comprising: a plurality of straight toothed portions along said one edge, said toothed portions being provided with saw teeth extending outwardly from said edge; and a transistion between two of said portions providing a stepped relation between said two of said portions, one of said two of said portions being stepped in the direction the teeth extend from said edge in such manner that projection lines along the teeth of said two of said portions intersect at a point more distal from the other portion of said two portions than from said one of said two portions.

2. A saw blade adapted to sawing with one edge thereof, comprising a plurality of toothed portions along said sawing edge, a limit stop edge between two said portions so that one of said portions extends in stepped relation to another of said portions, said portions being related to form an angle outwardly of the free end of the blade, said angle being within a range of zero to ninety degrees.

3. A saw blade adapted to sawing with one edge thereof, comprising a plurality of straight toothed portions along said sawing edge, one of said portions extending in stepped relation to another of said portions in such manner that projection lines along the teeth of said one and said another portions form an included angle having a vertex beyond the free end of said blade.

4. A saw blade having handle means at one end, said blade being adapted to sawing with one edge thereof, said edge comprising a plurality of toothed portions, one of said portions being straight and extending along a straight line and in stepped relation to another of said portions, said one portion being disposed further from said one end than said another of said portions, a limit stop edge intermediate said portions, said portions being related to form an angle outwardly of the free end of the blade, said angle being within a range of zero to ninety degrees.

References Cited in the file of this patent

UNITED STATES PATENTS

| | | |
|---|---|---|
| 522,749 | Bedell | July 10, 1894 |
| 563,521 | Walter | July 7, 1896 |
| 770,094 | McGill | Sept. 13, 1904 |
| 829,158 | Keepfer | Aug. 21, 1906 |
| 991,249 | Sizemore | May 2, 1911 |